(12) United States Patent
Shioiri et al.

(10) Patent No.: US 9,771,986 B2
(45) Date of Patent: Sep. 26, 2017

(54) SELECTABLE ONE-WAY CLUTCH

(71) Applicant: TOYOTA JIDOSHA KABUSHIKI KAISHA, Toyota-shi, Aichi-ken (JP)

(72) Inventors: Hiroyuki Shioiri, Yokohama (JP); Hideaki Komada, Gotemba (JP); Yuki Kurosaki, Susono (JP); Hiroyuki Shibata, Odawara (JP); Hiroki Yasui, Susono (JP); Tomohiro Abe, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/152,954

(22) Filed: May 12, 2016

(65) Prior Publication Data
US 2016/0341263 A1  Nov. 24, 2016

(30) Foreign Application Priority Data

May 18, 2015  (JP) .................................. 2015-101126

(51) Int. Cl.
*F16D 41/14* (2006.01)
*F16D 41/12* (2006.01)

(52) U.S. Cl.
CPC ........... *F16D 41/125* (2013.01); *F16D 41/14* (2013.01); *F16D 2300/06* (2013.01)

(58) Field of Classification Search
CPC ........ F16D 41/12; F16D 41/125; F16D 41/14; F16D 2300/06
See application file for complete search history.

(56) References Cited

U.S. PATENT DOCUMENTS

| 6,244,965 B1 * | 6/2001 | Klecker ................. F16D 41/12 192/43.1 |
| 2008/0169165 A1 * | 7/2008 | Samie .................... F16D 41/16 192/43 |

FOREIGN PATENT DOCUMENTS

JP           5120650 B2      1/2013

* cited by examiner

*Primary Examiner* — Richard Lorence
(74) *Attorney, Agent, or Firm* — Andrews Kurth Kenyon LLP

(57) ABSTRACT

A selectable one-way clutch adapted to prevent an undesirable engagement is provided. The selectable one-way clutch comprises a drag increasing device that increases a drag of oil acting between the pocket plate and the selector plate against a force rotating the selector plate in a direction to bring the selectable one-way clutch into the engagement mode.

7 Claims, 4 Drawing Sheets

SELECTABLE ONE-WAY CLUTCH

CROSS-REFERENCE TO RELATED APPLICATION

The present application claims priority to Japanese Patent Application No. 2015-101126 filed on May 18, 2015, which is incorporated herein by reference in its entirety.

BACKGROUND

Field of the Invention

Preferred embodiment of the present application relates to the art of a selectable one-way clutch adapted to selectively enable torque transmission only in one direction and to interrupt torque transmission in both directions.

Discussion of the Related Art

Japanese Patent Publication No. 5120650 describes a hybrid drive unit having one-way clutches. According to the teachings of Japanese Patent Publication No. 5120650, power of an engine is distributed to a first motor-generator and to an output member through a planetary gear unit serving as a power distribution device. The first motor-generator is operated as a generator in such a manner as to establish a reaction force to control a speed of the engine, and a second motor-generator is operated as a motor by an electric power generated by the first motor-generator to generate a driving torque. The one-way clutches are disposed between the first motor-generator and a stationery member such as a casing, between the first motor-generator and a carrier of the planetary gear unit, and between the carrier and the stationary member. Those one-way clutches are arranged in tandem with dog clutches. In the hybrid drive unit taught by Japanese Patent Publication No. 5120650, therefore, rotation of a sun gear or the carrier of the planetary gear unit connected to the first motor-generator can be halted in a predetermined direction so that the sun gear and the carrier can be rotated integrally to diversify a driving condition.

A conventional selectable one-way clutch is adapted to selectively enable torque transmission only in one direction. To this end, in the selectable one-way clutch, a selector plate interposed between a pocket plate and a notch plate is rotated by an electromagnetic actuator or the like to selectively provide an engagement between the selector plate and the pocket plate. The selectable one-way clutch of this kind may also be used in the hybrid vehicle taught by Japanese Patent No. 5120650 instead of the one-way clutch.

In order to reduce friction, lubrication oil is applied to the selectable one-way clutch to form oil films in friction sites between the pocket plate and the selector plate, and between the selector plate and the notch plate. However, if viscosity of the oil is too high, the selector plate may be rotated undesirably by a drag torque or a shearing force resulting from a rotation of the notch plate if the pocket plate is halted. For this reason, the pocket plate may be brought into engagement accidentally with the notch plate if temperature is extremely low.

SUMMARY

Aspects of a preferred embodiment has been conceived noting the foregoing technical problems, and it is therefore an object of the preferred embodiment is to provide a selectable one-way clutch that can prevent the selector plate from being rotated undesirably by a rotation of the notch plate through the lubrication oil.

Preferred embodiment relates to a selectable one-way clutch, comprising: a pocket plate; a notch plate that is opposed to the pocket plate; a selector plate that is interposed between the pocket plate and the notch plate while being allowed to be rotated by an actuator relatively with the pocket plate and the notch plate within a predetermined angle to selectively switch an operating mode of the selectable one-way clutch between an overrunning mode in which the notch plate is allowed to rotate relatively with the pocket plate in both directions without transmitting torque, and an engagement mode in which the notch plate is brought into engagement with the pocket plate to enable torque transmission in one direction; and a lubrication oil applied between the pocket plate and the notch plate. In order to achieve the above-explained objective, according to the preferred embodiment of the present application, the selectable one-way clutch is provided with a drag increasing device that increases a drag acting between the pocket plate and the selector plate against a force rotating the selector plate in a direction to bring the selectable one-way clutch into the engagement mode.

In a non-limiting embodiment, the drag increasing device may be adapted to increase the drag to be greater than a drag torque acting between the selector plate and the notch plate through the oil when the notch plate is rotated in a direction to rotate the selector plate to bring the selectable one-way clutch into the engagement mode.

In a non-limiting embodiment, the drag increasing device may include first teeth formed on the pocket plate and second teeth formed on the selector plate engaged with each other through the oil.

In a non-limiting embodiment, the drag increasing device may include a depression formed on the pocket plate to be filled with the oil, and a protrusion formed on the selector plate to protrude toward the depression. In this case, the drag increasing device may increase the drag derived from viscosity of the oil in the depression by moving the protrusion within the depression.

Thus, according to the preferred embodiment, the selectable one-way clutch is provided with the drag increasing device that increases the drag acting between the pocket plate and the selector plate against the torque rotating the selector plate in a direction to bring the selectable one-way clutch into the engagement mode. According to the preferred embodiment, therefore, the selector plate can be prevented from being rotated undesirably by the drag increasing device, even if the drag torque resulting from an increase in the oil viscosity is applied to the selector plate in the direction to bring the selectable one-way clutch into the engagement mode. In addition, since the drag of the oil established by the drag increasing device is weaker than a rotational force applied to the selector plate by the actuator, the selector plate can be rotated certainly by the actuator to bring the selectable one-way clutch into the engagement mode as intended.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE ILLUSTRATIVE EMBODIMENT(S)

Figure 1:
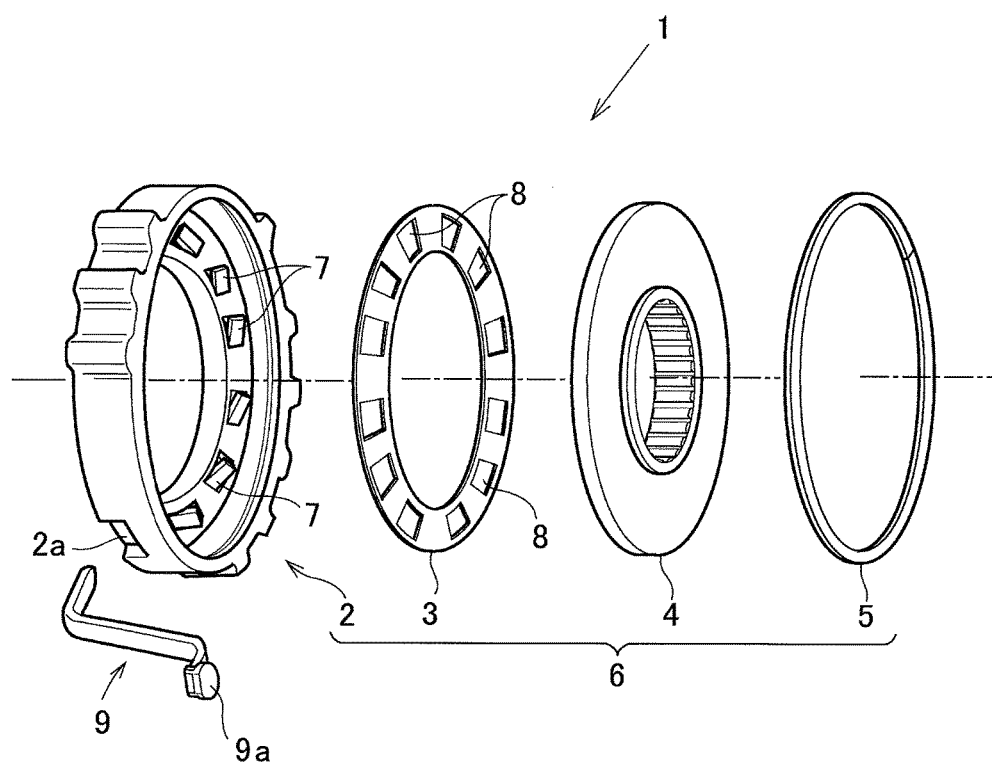
FIG. 1 is an exploded view of the selectable one-way clutch according to the preferred embodiment.

Referring now to FIG. 1, there are shown each part of a body assembly 6 of a selectable one-way clutch (to be abbreviated as the "SOWC" hereinafter) 1 according to the preferred embodiment in detail. As shown in FIG. 1, the body assembly 6 of the SOWC 1 comprises a pocket plate 2, a selector plate 3, and a notch plate 4. The pocket plate 2 comprises an outer cylinder and an annular plate formed along an inner circumference of the cylinder. The selector plate 3 and the notch plate 4 are held in the cylinder in the order shown in FIG. 1, and a snap ring 5 is fitted into a clearance between an outer circumference of the notch plate 4 and an inner circumference of the cylinder of the pocket plate 2 to close the pocket plate 2.

As illustrated in FIG. 1, a plurality of pockets 2b are formed in a circular manner on a face of the annular plate of the pocket plate 2 being opposed to the notch plate 4, and a rectangular strut 7 is individually held in each pocket 2b in a pivotal manner around one end thereof as a fulcrum. A cross-section of the SOWC 1 is partially shown in FIG. 2. In order to push up the other end of the strut 7 toward the notch plate 4, a spring (not shown) is interposed between one end of the strut 7 and a bottom of the pocket 2b.

The selector plate 3 is an annular member having similar dimensions as the annular plate of the pocket plate 2, and apertures 8 are formed on the selector plate 3 in a circular manner and in a same number as the pockets 2b. When the selector plate 3 is rotated in the pocket plate 2 to an engagement position at which the apertures 8 are individually overlapped with each of the pockets 2b, said other end (to be called the "leading end" hereinafter) of each of the strut 7 is allowed to be pushed up by the spring to be brought into engagement with a notch 4a of the notch plate 4. By contrast, when the selector plate 3 is rotated to a disengagement position at which the apertures 8 are individually displaced from each of the pockets 2b, each of the strut 7 is pushed into the pocket 2b by the selector plate 3.

The notch plate 4 is also an annular member, and the notches 4a are formed on a face of the notch plate 4 facing to the pocket plate 2 in a circular manner and in the same number as the pockets 2b of the pocket plate 2. When the leading end of the strut 7 is pushed into the notch 4a of the notch plate 4 through the aperture 8 of the selector plate 3, the leading end of the strut 7 is brought into abutment to an engagement wall 4b of the notch 4a.

The selector plate 3 and an actuator (not shown) are connected through an arm 9. One of the end portions of the arm 9 is inserted into a through hole 2a of the pocket plate 2 from outside to be connected to the selector plate 3 in such a manner as to be rotated integrally therewith. An intermediate portion of the arm 9 is bent to extend parallel to the cylinder of the pocket plate 2, and the other end of the arm 9 is bent radially outwardly at a point further than the cylinder of the pocket plate 2. In addition, a semi-circular head 9a is attached to the other leading end of the arm 9, and the head 9a is connected to a plunger of the actuator.

An operating mode of the SOWC 1 is switched selectively between an engagement mode and an overrunning mode by rotating the selector plate 3 within a predetermined angle. Specifically, in the engagement mode, each of the strut 7 is pushed up into the notch 4a of the notch plate 4 so that the notch plate 4 is brought into engagement with the pocket plate 2 to enable torque transmission in one direction. By contrast, in the overrunning mode, each of the strut 7 is pushed into the pocket 2b of the pocket plate 2 by the selector plate 3 so that the notch plate 4 is allowed to rotate relatively with the pocket plate 2 in both directions without transmitting torque. In order to limit damage on those plates, lubrication oil is applied to a contact site between those plates.

Figure 2:
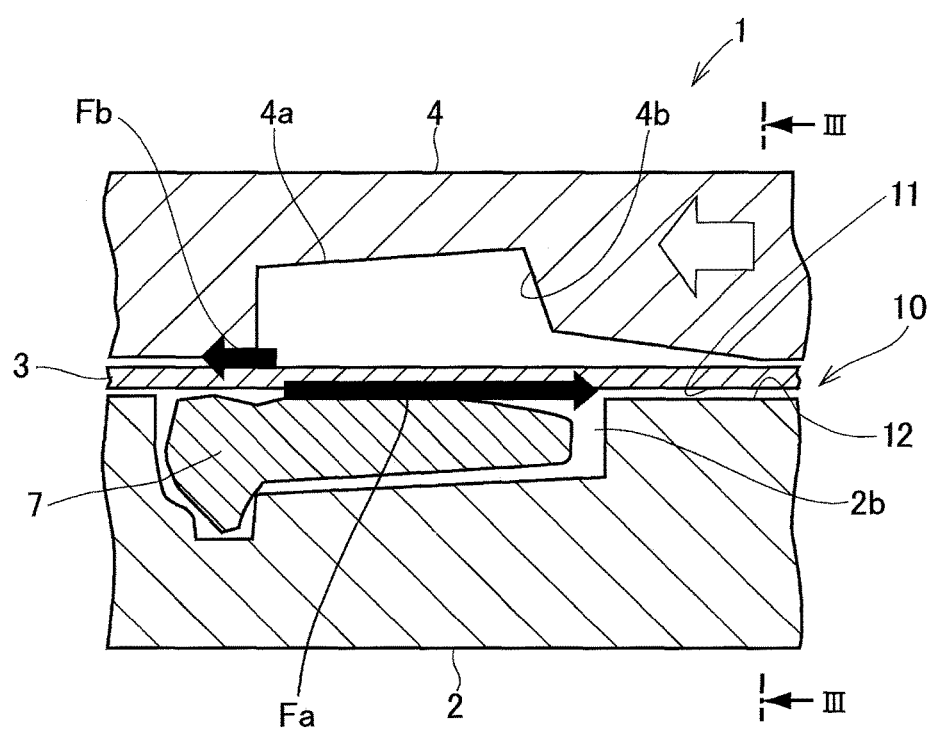
FIG. 2 is a partial cross-sectional view of the selectable one-way clutch shown in FIG. 1 having a drag increasing device.
Figure 3:
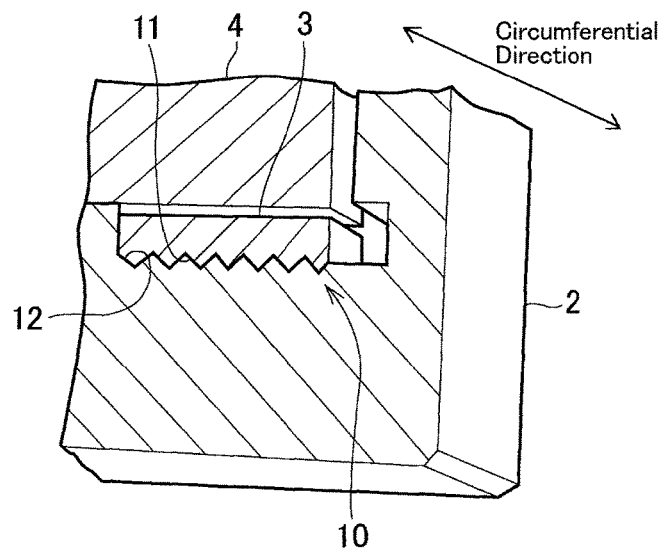
FIG. 3 is a cross-sectional view showing a cross-section of the selectable one-way clutch shown in FIG. 2 along III-III line.

As illustrated in FIG. 2, in order to increase a contact area between the pocket plate 2 and the selector plate 3 thereby increasing a shear resistance of an oil film interposed therebetween, a drag increasing device(s) 10 is/are arranged between the pocket plate 2 and the selector plate 3. Specifically, the drag increasing device 10 comprises first teeth 11 formed on the annular plate of the pocket plate 2 between the struts 7, and second teeth 12 formed on the selector plate 3 between the apertures 8. As depicted in FIG. 3, the first teeth 11 of the pocket plate 2 and the second teeth 12 of the selector plate 3 are meshed with each other.

In the SOWC 1, therefore, an amount of the oil interposed between the first teeth 11 and the second teeth 12 is increased so that a shear stress Fa acting between the pocket plate 2 and the selector plate 3 can be increased. That is, when the notch plate 4 is rotated in the direction to rotate the selector plate 3 to the engagement position, a drag or resistance of the oil is established between the first teeth 11 and the second teeth 12, and such drag of the oil is greater than a drag torque Fb applied to the selector plate 3 by the oil but weaker than a rotational force applied to the selector plate 3 by the actuator. According to the preferred embodiment, therefore, the selector plate 3 can be prevented from being rotated undesirably by the drag increasing device 10, even if the drag torque resulting from an increase in the oil viscosity is applied to the selector plate 3 in the direction toward the engagement position. In addition, since the drag of the oil established by the drag increasing device 10 is weaker than the rotational force applied to the selector plate 3 by the actuator, the selector plate can be rotated certainly by the actuator to the engagement position.

Figure 4:
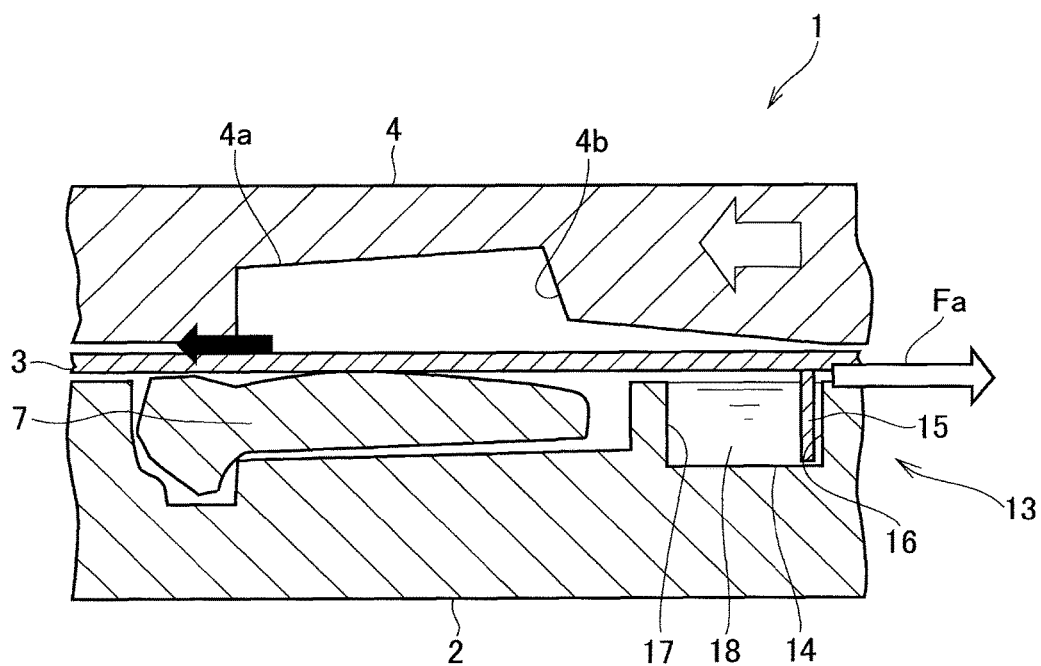
FIG. 4 is a partial cross-sectional view showing another example of the drag increasing device.

Turning to FIG. 4, there is shown another example of the drag increasing device. The drag increasing device 13 shown in FIG. 4 comprises a depression 14 formed on the pocket plate 2, and a protrusion 15 formed on the selector plate 3. In FIG. 4, common reference numerals are allotted to the elements in common with those shown in FIGS. 2 and 3, and detailed explanation for the common elements will be omitted.

Figure 5:
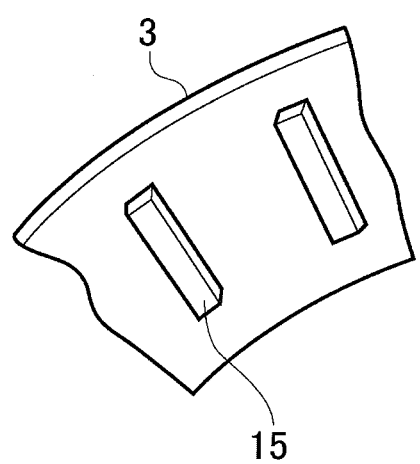
FIG. 5 is partial perspective view showing a protrusion of the drag increasing device.

Each of the protrusion 15 is formed on the selector plate 3 at a point displaced from the aperture 8. Specifically, as illustrated in FIGS. 4 and 5, the protrusion 15 is a plate member extending radially on the selector plate 3, while protruding from the selector plate 3 in an axial direction toward the depression 14 of the pocket plate 2.

Figure 6:
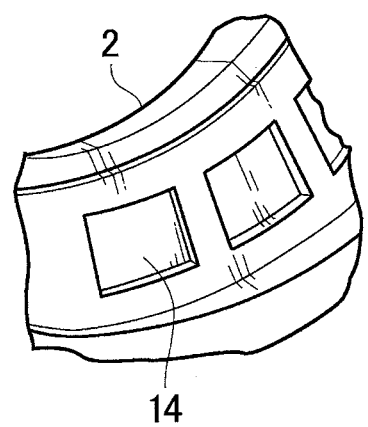
FIG. 6 is partial perspective view showing a depression of the drag increasing device.

On the other hand, each of the depression 14 is formed on the annular plate of the pocket plate 2 at a point displaced from the strut 7. Specifically, as illustrated in FIGS. 4 and 6, the depression 14 is has sufficient depth and width to accommodate the protrusion 15, and also has a certain length in the circumferential direction of the pocket plate 2.

The depression 14 comprises a first inner wall 16 and a second inner wall 17 both of which extends in the radial direction of the pocket plate 2. That is, in the depression 14, the first inner wall 16 and the second inner wall 17 are opposed to each other in the circumferential direction of the pocket plate 2. When the selector plate 3 is at the disengagement position, the protrusion 15 is situated close to the first inner wall 16 of the depression 14. In this situation a wide clearance is created between the protrusion 15 and the second inner wall 17 of the depression 14 in the circumferential direction so that the selector plate 3 is allowed to be rotated by the actuator toward the engagement position within the clearance between the protrusion 15 and the second inner wall 17.

When the selector plate 3 is at the disengagement position, the depression 14 is filled with the oil between the protrusion 15 and the second inner wall 17. That is, the drag increasing device 13 shown in FIG. 4 serves as an oil damper. Specifically, if the selector plate 3 is subjected to a drag torque Fb through the oil, a drag Fa is applied to the protrusion 15 of the selector plate 3 depending on viscosity of the oil. According to another example, therefore, the selector plate 3 may also be prevented from being rotated undesirably by the drag increasing device 13, even if the selector plate 3 is subjected to the drag torque through the oil.

Although the above exemplary embodiment of the present application have been described, it will be understood by those skilled in the art that the present application should not be limited to the described exemplary embodiment, and various changes and modifications can be made within the spirit and scope of the present application. For example, the drag increasing device may be adapted to increase the drag acting between the selector plate 3 and the pocket plate 2 by increasing a friction acting therebetween, instead of increasing a resistance derived from oil viscosity.

What is claimed is:

1. A selectable one-way clutch, comprising:
   a pocket plate;
   a notch plate that is opposed to the pocket plate;
   a selector plate that is interposed between the pocket plate and the notch plate while being allowed to be rotated by an actuator relatively with the pocket plate and the notch plate within a predetermined angle to selectively switch an operating mode of the selectable one-way clutch between an overrunning mode in which the notch plate is allowed to rotate relatively with the pocket plate in both directions without transmitting torque, and an engagement mode in which the notch plate is brought into engagement with the pocket plate to enable torque transmission in one direction;
   a lubrication oil applied between the pocket plate and the notch plate; and
   a drag increasing device that increases a drag acting between the pocket plate and the selector plate against a force rotating the selector plate in a direction to bring the selectable one-way clutch into the engagement mode.

2. The selectable one-way clutch as claimed in claim 1, wherein the drag increasing device is adapted to increase the drag to be greater than a drag torque acting between the selector plate and the notch plate through the oil when the notch plate is rotated in a direction to rotate the selector plate to bring the selectable one-way clutch into the engagement mode.

3. The selectable one-way clutch as claimed in claim 2,
   wherein the drag increasing device includes first teeth formed on the pocket plate and second teeth formed on the selector plate, and
   wherein the first teeth and the second teeth are engaged with each other through the oil.

4. The selectable one-way clutch as claimed in claim 2,
   wherein the drag increasing device includes a depression formed on the pocket plate to be filled with the oil, and a protrusion formed on the selector plate to protrude toward the depression, and
   wherein the drag increasing device is adapted to increase the drag derived from viscosity of the oil in the depression by moving the protrusion within the depression.

5. The selectable one-way clutch as claimed in claim 1,
   wherein the drag increasing device includes first teeth formed on the pocket plate and second teeth formed on the selector plate, and
   wherein the first teeth and the second teeth are engaged with each other through the oil.

6. The selectable one-way clutch as claimed in claim 1,
   wherein the drag increasing device includes a depression formed on the pocket plate to be filled with the oil, and a protrusion formed on the selector plate to protrude toward the depression, and
   wherein the drag increasing device is adapted to increase the drag derived from viscosity of the oil in the depression by moving the protrusion within the depression.

7. The selectable one-way clutch as claimed in claim 1,
   wherein the drag increasing device includes a first portion formed on the pocket plate and a second portion formed on the selector plate, and the first and second portions are engageable with each other through the oil.

* * * * *